Figure 1:
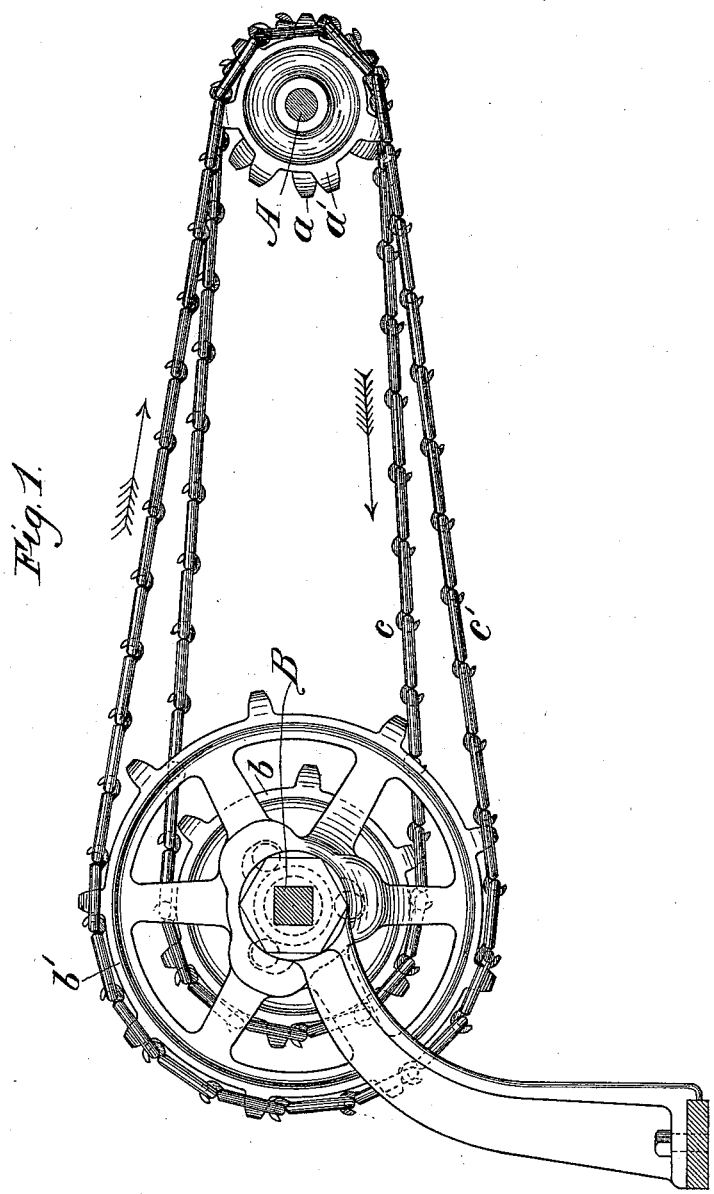

(No Model.) 4 Sheets—Sheet 1.
H. F. CRANDALL.
POWER TRANSMITTING MECHANISM.

No. 541,040. Patented June 11, 1895.

Witnesses:
Chas. L. Goss.
Frank T. Krehla.

Inventor:
Henry F. Crandall,
By Winter Flanders Smith Bottum & Goss
Attorneys.

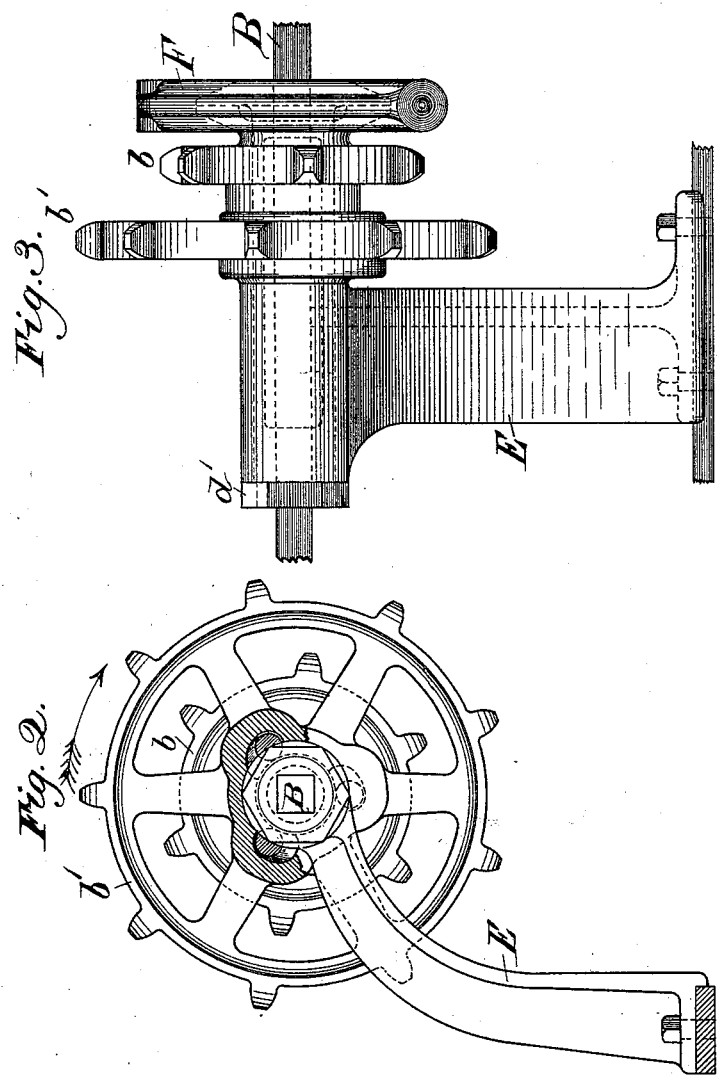

(No Model.) 4 Sheets—Sheet 3.
H. F. CRANDALL.
POWER TRANSMITTING MECHANISM.
No. 541,040. Patented June 11, 1895.
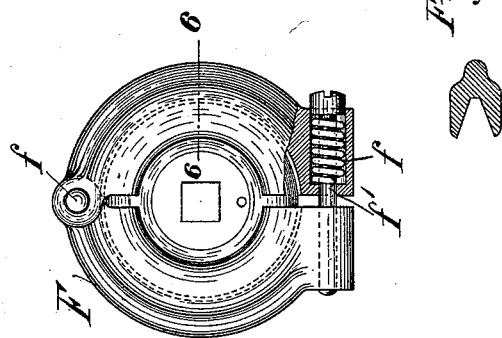
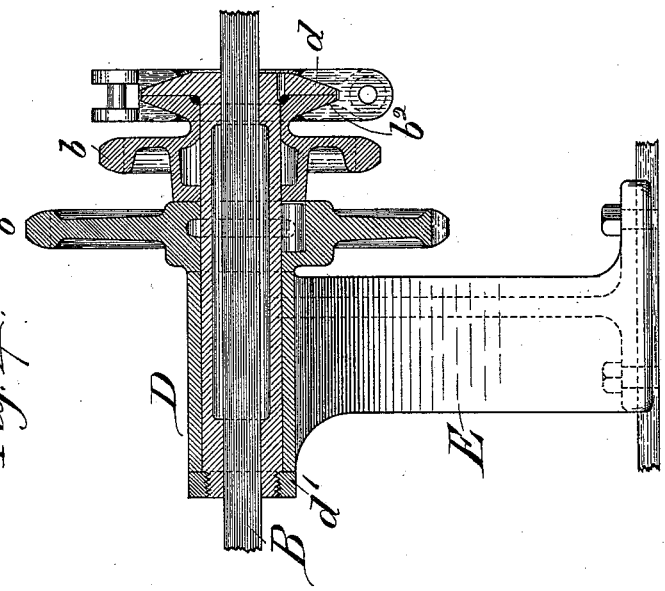
Witnesses:
Chas. L. Goss.
Frank H. Krehl
Inventor:
Henry F. Crandall
By Winkler Handlen Smith Bottum &c.
Attorneys.

(No Model.) 4 Sheets—Sheet 4.
H. F. CRANDALL.
POWER TRANSMITTING MECHANISM.
No. 541,040. Patented June 11, 1895.
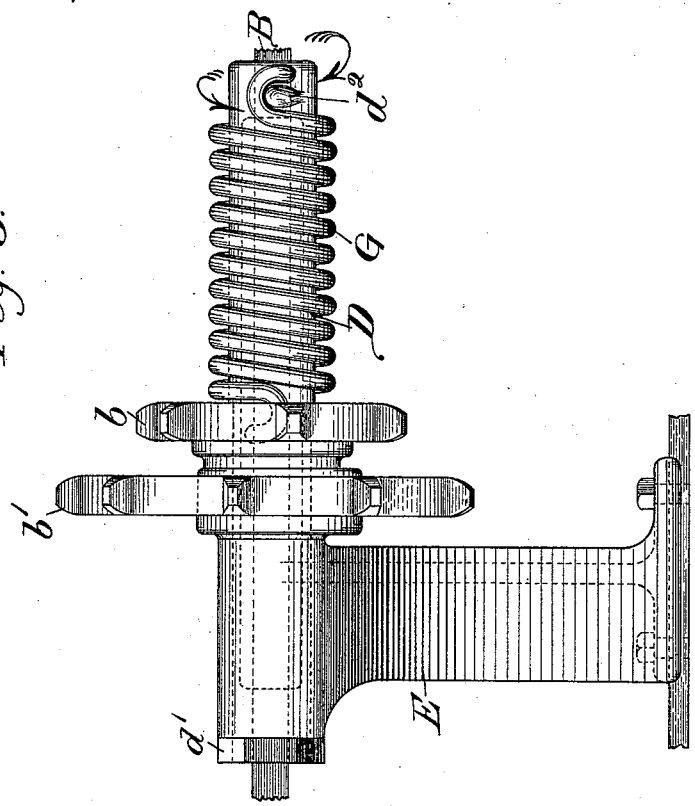
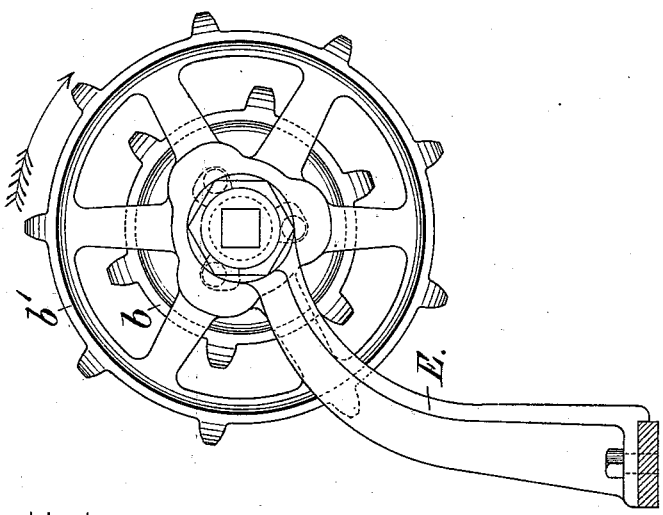

UNITED STATES PATENT OFFICE.

HENRY F. CRANDALL, OF MILWAUKEE, WISCONSIN, ASSIGNOR TO THE MILWAUKEE HARVESTER COMPANY, OF SAME PLACE.

POWER-TRANSMITTING MECHANISM.

SPECIFICATION forming part of Letters Patent No. 541,040, dated June 11, 1895.

Application filed July 30, 1894. Serial No. 518,914. (No model.)

*To all whom it may concern:*

Be it known that I, HENRY F. CRANDALL, of Milwaukee, in the county of Milwaukee and State of Wisconsin, have invented certain new and useful Improvements in Power-Transmitting Mechanism; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to machines which a variable load or work tends to stop, clog or choke when such load or work is increased. Its main object is to avoid the clogging, stalling or stopping of such a machine when its work or load is increased beyond a certain point, and it consists essentially of two driving connections between driving and driven parts, constructed and arranged to produce different rates of speed in the driven part and to automatically shift from one to the other as the work or load is increased or diminished.

For the purpose of illustration I have shown my invention as embodied in mechanism particularly designed for use with automatic grain binders, the work of which varies according to the condition of the grain on which it operates, but I do not wish to be understood as in any wise limiting myself to this particular application of the invention, as by obvious modifications it is applicable to other purposes.

In the accompanying drawings like letters designate the same parts in the several figures.

Figure 1 is an end elevation of variable-speed driving or power-transmitting mechanism embodying my invention. Fig. 2 is an end elevation; Fig. 3, a side elevation; Fig. 4, a vertical longitudinal section of the driven member of such mechanism; Fig. 5, an end elevation, partly in section, of the automatic friction grip or slip device constituting a part of such mechanism; Fig. 6, a section on the line 6 6, Fig. 5; and Figs. 7 and 8 are an end view and side elevation, respectively, of the driven member of such mechanism, showing a modified form of the slip or yielding device constituting a part of the fast driving connection.

Referring to Figs. 1 to 6 inclusive, A designates a driving shaft, which may be connected with and actuated by any suitable source of power. In the form of mechanism shown, it is provided with two sprocket wheels $a$ and $a'$.

B designates a driven shaft, which may be the packer shaft of a grain binder, or the shaft from which motion is imparted to the binder mechanism. Upon this shaft are mounted smaller and larger sprocket wheels $b$ and $b'$, which are connected by chain belts $c$ and $c'$ with the sprocket wheels $a$ and $a'$ on the driving shaft.

D represents a rotary sleeve supported by and capable of turning in a bracket E, or other suitable supporting bearing. It is formed or provided at one end with a disk or flange $d$, beveled on its outer side, as shown in Fig. 4, and is provided at the opposite end with a screw thread and nut $d'$, by which it is held and restrained from endwise movement in the bracket E. The shaft B is movable lengthwise through said sleeve, but is incapable of turning therein. The smaller sprocket wheel $b$, is loosely mounted on the sleeve D, and is formed or provided at one side with a flange or disk $b^2$, corresponding with the disk or flange $d$, against which it bears.

F is a friction ring composed of two segments or parts hinged together at $f$ at one end and yieldingly connected at their opposite ends by a pin or screw $f'$, passing through perforated ears thereon, and an interposed spiral spring $f^2$, as shown in Fig. 5. This ring F is formed on the inner side, as shown in Fig. 6, with a V-shaped groove to fit the outer beveled faces of the disks $b^2$ and $d$, upon which it is mounted. The larger sprocket wheel $b'$ is also loosely mounted upon the sleeve D between the bracket E and the hub of the smaller sprocket wheel $b$. It is formed on the inner side of its hub with inclined recesses in which are inserted friction rollers or disks, as indicated by dotted lines in Fig. 2, or is provided with any other suitable form of ratchet or grip device whereby the rotation of the sleeve D in said sprocket wheel $b'$ is permitted, in one direction, forward, but not in the other, backward.

Referring to Fig. 8, illustrating a modification of the mechanism shown in Figs. 3, 4 and 5, the sleeve D is extended beyond the smaller sprocket wheel b, and provided with a lug or projection $d^2$, to which is hooked or otherwise secured, one end of a spiral spring G, which is coiled around the outside of said sleeve and attached at its opposite end to the sprocket wheel b. This spring and its connections serve the same purpose as the disks $b^2$ and d, the friction ring F, and their connections hereinbefore described.

My improved driving mechanism operates as follows: Under the ordinary or normal load the sprocket wheel a, operates through the chain belt c and sprocket wheel b, to drive the shaft B at the higher rate of speed. When however, the load from any cause is increased beyond a certain point, or sufficiently to overcome the frictional engagement between the disks $b^2$ and d produced by the spring $f^2$ acting through the ring F, or by the tension of the spring G, the movement of shaft B will be retarded sufficiently to cause the engagement therewith of the sprocket wheel $b'$ by its friction rollers or balls or other clutching device and the sprocket wheel $a'$ operating through the chain belt $c'$ and said sprocket wheel $b'$ to positively drive said shaft B at a slower rate of speed while the sprocket wheel b is turned forward thereon at the faster rate. As soon as the load is reduced to a point insufficient to overcome the frictional engagement between the disks $b^2$ and d, or the tension of spring G, the shaft B will be driven with the sprocket wheel b at the higher rate of speed while the sprocket wheel $b'$, turning at the slower rate, slips backward upon the sleeve D. In this way power will be transmitted from the driving shaft A running at a constant speed through the higher or lower-speed driving connections hereinbefore explained, to the shaft B, imparting a more or less rapid movement thereto according to the resistance opposed to such movement. Thus, in the case of a grain binder, whenever such resistance to its operation is produced by heavy or tangled grain or other causes as would ordinarily clog or stop it, the fast driving connection slips, and the slow driving connection takes effect, thereby increasing the power exerted upon the binding mechanism and preventing the stopping or clogging of the binder, and as soon as the increased resistance is overcome, the fast driving connection resumes operation.

With the device shown in Figs. 3, 4 and 5, the automatic slip device in the fast driving connection may be set by means of the screw $f'$ to produce more or less frictional engagement between the disks $b^2$ and d, and thus cause the slow driving connection to take effect at different degrees of resistance to the movement of shaft B, or when the machine is subjected to any desired amount of load.

It is obvious that in place of the sprocket wheels and chain belts herein shown and described, gears might be substituted. In short, various modifications in the details of the mechanism are contemplated, as within the spirit and scope of my invention.

I claim—

1. In power transmitting mechanism, the combination with a driving and a driven part, of a faster driving connection and a separate slower driving connection between them, and means whereby said connections are arranged to operate according to the load or resistance encountered, shifting automatically from one to the other as the load or resistance increases and diminishes, substantially as and for the purposes set forth.

2. In power transmitting mechanism, the combination of two driving gear trains arranged to communicate motion at different rates of speed from the driving member to the driven member, the slower speed train comprising an automatic clutching or gripping device whereby said slower train is caused to take effect on said driven member when the faster train fails to actuate it, and the faster-speed train comprising a slipping or yielding connection whereby it is caused to actuate the driven member under a certain load, but to automatically intermit when the load is increased, substantially as and for the purposes set forth.

3. In power transmitting mechanism, the combination with a driving and a driven member, of slower and faster speed gearing connecting them, a clutch applied to the slower speed gearing so as to permit the driven member to turn at a faster but not at a slower rate, and a slip or yielding connection applied to the faster speed gearing so as to permit the driven member to turn at a slower rate when the load exceeds a certain amount, substantially as and for the purposes set forth.

4. In power transmitting mechanism, the combination with a driving and a driven member, of faster and slower speed gearing connecting them, a clutch applied to the slower speed gearing so as to permit the driven member to turn at a faster but not a slower rate, and an adjustable friction grip or slip connection applied to the faster speed gearing so as to permit the driven member to turn at a slower rate under any desired load, substantially as and for the purposes set forth.

5. In variable speed power transmitting mechanism, the combination with a driving and a driven shaft or member, two trains of gearing connecting them and constructed and arranged to communicate different rates of speed from the driving to the driven member, one wheel of the slower train being provided with one or more inclines and friction rollers arranged to permit the part on which it is mounted to turn faster but not slower, and a yielding or slipping connection between two members of the faster speed train, substantially as and for the purposes set forth.

6. In variable speed power transmitting mechanism, the combination with a driving and a driven shaft or member, of two trains of gearing connecting them and constructed and arranged to impart different rates of speed to the driven member, a clutching device applied to the slow speed train so as to permit the driven member to turn at a faster but not a slower rate, and a yielding or slipping connection in the fast speed train consisting of two friction wheels and means of producing a variable engagement thereof, substantially as and for the purposes set forth.

In testimony that I claim the foregoing as my own I affix my signature in presence of two witnesses.

HENRY F. CRANDALL.

Witnesses:
CHAS. L. GOSS,
CHAS. F. FAWSETT.